Figure 1:
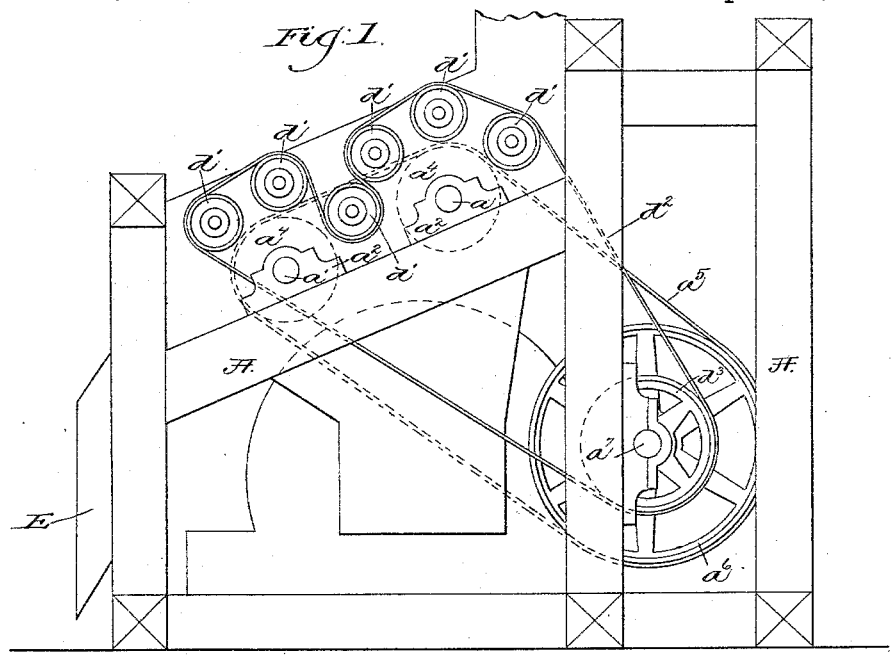

(No Model.) 2 Sheets—Sheet 1.

W. F. CORNE.
METHOD OF AND APPARATUS FOR TREATING FIBER COATED SEED.

No. 381,616. Patented Apr. 24, 1888.

Witnesses
Fred L. Emery.
John F. C. Prenkert

Inventor.
William F. Corne
by Crosby & Gregory.
atty's (No Model.) 2 Sheets—Sheet 2.
W. F. CORNE.
METHOD OF AND APPARATUS FOR TREATING FIBER COATED SEED.
No. 381,616. Patented Apr. 24, 1888.

Witnesses
Fred L. Emery.
John F. C. Prinkert.

Inventor.
William F. Corne
by Crosby & Gregory
Att'ys.

United States Patent Office.

WILLIAM F. CORNE, OF CAMBRIDGE, MASSACHUSETTS.

METHOD OF AND APPARATUS FOR TREATING FIBER-COATED SEED.

SPECIFICATION forming part of Letters Patent No. 381,616, dated April 24, 1888.

Application filed January 5, 1887. Serial No. 223,458. (No model.)

*To all whom it may concern:*

Be it known that I, WILLIAM F. CORNE, of Cambridge, county of Middlesex, and State of Massachusetts, have invented an Improvement in Method of and Apparatus for Treating Fiber-Coated Seed, of which the following description, in connection with the accompanying drawings, is a specification, like letters on the drawings representing like parts.
This invention has for its object to provide a novel method and apparatus for removing the fiber adhering to cotton and other fiber-coated seeds.

In accordance with my invention the fiber-coated seed fed into the apparatus is maintained pressed against the teeth of a rotary saw or other toothed surface by air, which may either be drawn or forced through the apparatus, the said toothed surface detaching the fiber adhering to the seed, and the same pneumatic force removing from the machine the thus detached fiber.

The form of apparatus herein shown has two sets or gangs of rotating circular saws mounted upon shafts. The apparatus above the circular saws is divided into pockets by check-bars, which latter are provided at their sides nearer the saws with fingers projecting between the saws, which check the course of the seeds and prevent them from being carried out of the pocket by the saws, the fingers also sustaining the seeds while the teeth of the saws are acting upon them. The check-bars at opposite ends of the apparatus are cut away or made narrower to form passages from one pocket to another. The seed deposited at the end of one pocket from the pocket preceding it is carried across the apparatus to the passage leading to the next pocket by a worm driven in suitable manner, there being a worm for each pocket, the seed substantially freed from its fiber being deposited in a chute connected with the last of the passages referred to and leading to a suitable receptacle.
My invention consists, essentially, in subjecting fiber-coated seeds to the action of a rotary toothed surface, against which the seeds are forced by a current or blast of air, such pneumatic force thereafter acting to remove from the machine the fiber detached from the seeds while in contact with the aforesaid rotary toothed surface.

My invention also consists in a machine for removing fiber from fiber-coated seeds, comprising a casing, a rotary toothed surface therein, and check-bars provided with fingers and arranged to form pockets, combined with a worm in each pocket to carry the seed discharged into one end of a pocket to the other end thereof, as will be described.

Other features of my invention will be pointed out in the claims at the end of this specification.

Figure 2:
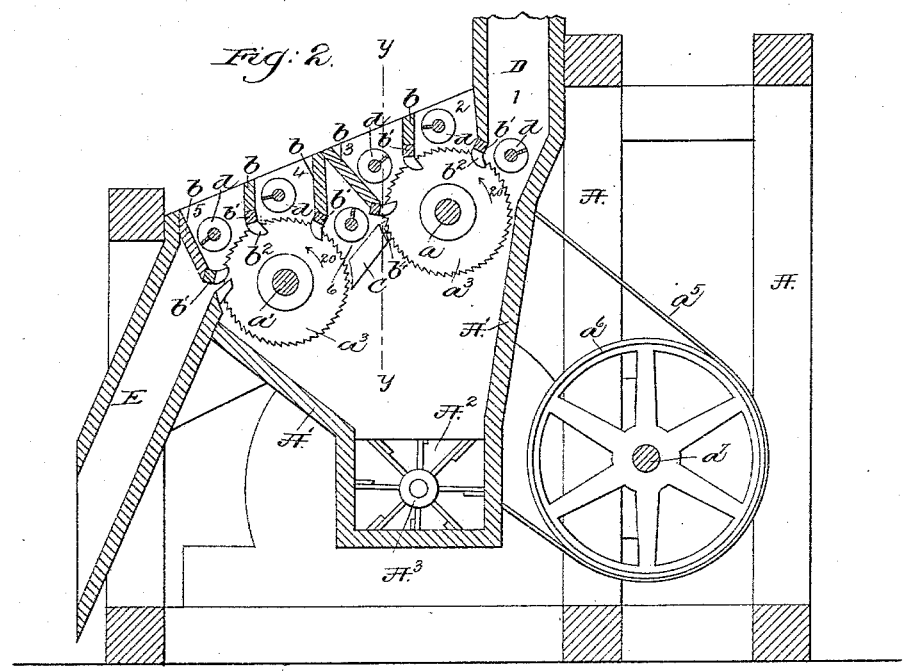
Figure 3:
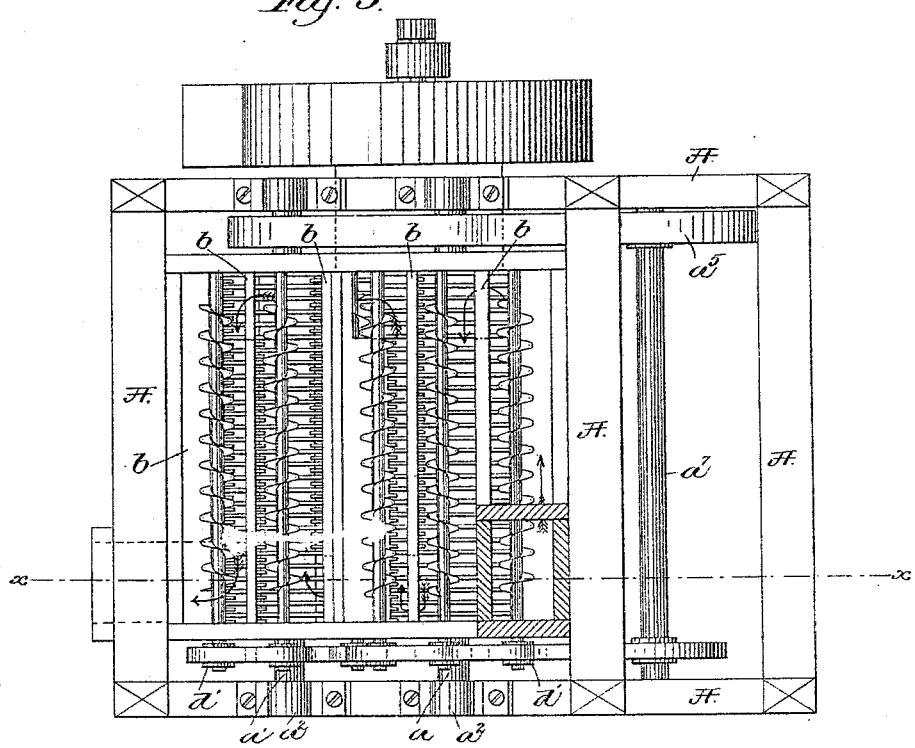
Figure 4:
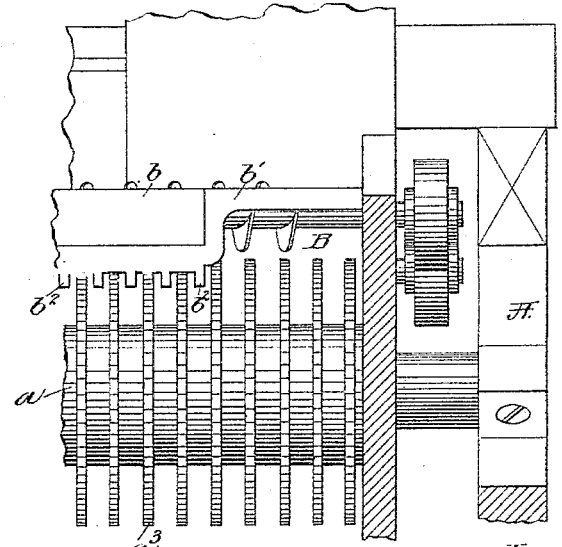

Figure 1 is a side elevation of one form of apparatus preferred by me and by which to practice my invention; Fig. 2, a vertical section of the apparatus, the section being taken on line $x$ $x$, Fig. 3; Fig. 3, a top or plan view of Fig. 1; Fig. 4, an enlarged sectional detail view showing part of one gang of saws and one check-bar, the section being taken on line $y$ $y$ of Fig. 2, the teeth of the saws being in full lines.

The frame-work A, of suitable shape to sustain the working parts, has secured to or forming part of it a casing, A', herein shown as funnel-shaped and connected at its lower end with a flue, $A^2$, leading to an exhaust-fan, $A^3$, driven in any suitable manner.

The casing A', near the top of the apparatus, contains, as shown, two shafts, $a$ $a'$, extended through the said casing and mounted in bearings $a^2$, supported by the frame-work A. (See Figs. 1 and 3.) Each shaft $a$ $a'$ has mounted upon it, as shown, a series of circular saws, $a^3$, which in practice will be set closely together, the said saws being rotated by pulleys $a^4$, (see dotted lines, Fig. 1,) mounted on said shafts, and driven by a belt, $a^5$, passing over a pulley, $a^6$, on the main shaft $a^7$, driven in usual manner.

The casing A' above the saws is divided, as shown, into pockets 1, 2, 3, 4, and 5 by check-bars, herein shown in Figs. 2 and 4 as made in two pieces, $b$ $b'$, the piece $b'$ having secured to or forming part of it fingers $b^2$, which project between the saws. The piece $b'$ of each check-bar on opposite sides of the apparatus is reduced or made smaller, so as to form a passage, as at B, (see Fig. 4,) which connects the successive pockets. Between the saws $a^3$ on the shafts $a$ $a'$ is a chute, C, provided with fingers $b^4$, similar to the fingers $b^2$, the said chute forming, with the two central check-bars, a pocket, 6. (See Fig. 2.)

The casing A' is provided with an inletchute, D, through which the fiber-covered seed is introduced into the pocket 1, in which, as well as in each of the other pockets referred to, is a worm, d. The shaft of each worm d is supported, as shown, by the casing A', and is provided with a pulley, d', (see Figs. 1 and 3,) the said pulleys being driven by a belt, $d^2$, passed about a pulley, $d^3$, on the main shaft $a^7$.

The fiber-coated seed fed into the apparatus through the chute D is drawn against the rotating saws by a current of air, which in the present instance is drawn through the apparatus by the fan $A^3$. The seeds thus brought in contact with the saws are thrown back and up, the saws revolving in the direction of arrows 20, (see Fig. 2,) and are again brought in contact with the teeth of the saws by the current af air, which results in keeping the seeds in violent agitation and motion first against the teeth and then in the air, and, striking against each other, substantially all the fiber is detached from the seed. The seeds in the pocket 1 are carried up by the saws on the shaft $a$ until they meet the fingers $b^2$, attached to the piece $b'$, forming part of the said pocket, when they are stopped, and, having accumulated in front of the said fingers, are then carried by the worm $d$ the length of the pocket and are discharged through the passage B into the next pocket, 2. The seeds are carried to the other end of the pocket 2 by the worm therein and discharged into the pocket 3, the said seeds as they are carried from one end of a pocket to the other, as indicated by arrows in Fig. 3, being subjected to the action of the teeth of the saws, and the fiber is detached from them.

From the pocket 3 the seeds are discharged into the pocket 6, where they are acted upon by the teeth of the saws on the shaft $a'$. From the pocket 6 they pass to the pocket 4, then to the pocket 5, and are discharged therefrom substantially free from fiber through the chute E. The fiber detached from the seeds is drawn between the saws and through the flue and fan, and may, if desired, be accumulated in any convenient manner.

Forcing the seeds with their attached fiber by means of air against a series of teeth, which in the movement of the seeds act again and again upon different portions of the fiber, enables the fiber to be removed without breaking the seed, as would be the case were the seed pressed against the teeth positively. Moreover, the pneumatic force used to hold the seed against the teeth to separate the fiber from the seeds thereafter acts to draw the fiber away from the separated seeds and the teeth and remove it from the machine.

I have herein shown two sets or gangs of saws; but I do not limit myself to two, as I may employ one or more sets or gangs.

In some instances I may dispense with the worms, in which case the seeds will themselves find their outlet from the pockets.

I claim—

1. The herein-described improvement in the art or method of treating fiber-coated seeds to remove the fiber therefrom, which consists in bringing the fiber-coated seed in forcible contact with a rotary toothed surface by suction and removing the detached fiber by the same pneumatic force, substantially as described.

2. In a machine for removing the fiber from fiber-coated seed, a casing, and a rotary toothed surface therein, combined with a number of check-bars provided with fingers co-operating with said toothed surface and arranged to form series of pockets having openings at opposite ends to afford communication of one pocket with the other in succession, substantially as and for the purpose described.

3. In a machine for removing the fiber from fiber-coated seed, a casing and a rotary toothed surface therein, and a number of check-bars provided with fingers co-operating with the said toothed surface and arranged to form a series of pockets communicating with each other at opposite ends by means of openings therein, combined with a worm in each of said pockets to carry the seed discharged into one end of a pocket to the other end thereof and to the next pocket, substantially as and for the purpose described.

4. In a machine for removing the fiber from fiber-coated seed, a casing, a rotary toothed surface therein, and a number of check-bars provided with fingers co-operating with the said toothed surface and arranged to form a series of pockets which communicate with each other at opposite ends by means of openings therein, and a worm in each pocket to carry the seed discharged into one end of a pocket to the other end thereof and to the next pocket, combined with a fan connected with the casing to draw a current of air therethrough and keep the seed against the toothed surface and remove the detached fiber, substantially as described.

5. In a machine for removing the fiber from fiber-coated seeds, a casing, two sets or gangs of saws or toothed surfaces therein, checkbars, and the chute C, forming pockets and provided with fingers and with openings leading from one pocket to another, combined with a worm in each pocket to carry the seed discharged into one end of a pocket to the other end thereof, as and for the purpose set forth.

In testimony whereof I have signed my name to this specification in the presence of two subscribing witnesses.

WILLIAM F. CORNE.

Witnesses:
G. W. GREGORY,
C. M. CONE.